US012675566B2

(12) United States Patent
Kaplan et al.

(10) Patent No.: US 12,675,566 B2
(45) Date of Patent: Jul. 7, 2026

(54) SECURE VIRTUALIZED PERFORMANCE MONITORING COUNTERS

(71) Applicant: ADVANCED MICRO DEVICES, INC., Santa Clara, CA (US)

(72) Inventors: David Kaplan, Austin, TX (US); Ruchir Dalal, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 417 days.

(21) Appl. No.: 18/090,831

(22) Filed: Dec. 29, 2022

(65) Prior Publication Data

US 2024/0220603 A1     Jul. 4, 2024

(51) Int. Cl.
*G06F 21/53* (2013.01)

(52) U.S. Cl.
CPC ........ *G06F 21/53* (2013.01); *G06F 2221/034* (2013.01)

(58) Field of Classification Search
CPC ..... G06F 21/53; G06F 21/60; G06F 2221/034
See application file for complete search history.

(56) References Cited

U.S. PATENT DOCUMENTS

| 2013/0007379 A1* | 1/2013 | Kegel | ...................... G06F 21/78 711/E12.001 |
| 2016/0378522 A1* | 12/2016 | Kaplan | ............... G06F 12/1036 718/1 |

OTHER PUBLICATIONS

Advanced Micro Devices, "Secure Encrypted Virtulaization API Version 0.24, Technical Preview" Publication No. 55766, Revision 3.24, Issued Apr. 2020, 122 Pages.
Kaplan, David, Jeremy Powell, Tom Wallter, "AMD Memory Encryption" Advanced Micro Devices, issued Oct. 18, 2021, 12 pages.
Spisak, Matt, "Hardware-Assisted Rootkits: Abusing Performance Counters on the ARM and X86 Architectures," Usenix Woot, 2016, 32 pages.
Kaplan, David, "Protecting VM Register State with SEV-ES" Advanced Micro Devices, 2017, 8 pages.
Mushtaq et al. "Challenges of Using Performance Counters in Security Against Side-Channel Leakage," HAL Open Science, 2020, 7 pages.
Peng, Chengcheng, "Using AMD Secure Encrypted Virtualization-Encrypted State (SEV-ES) on ThinkSystem Servers," Lenovo Press, 2022, 14 pages.
AMD Product Security; AMD.com. https://www.amd.com/en/corporate/product-security.

(Continued)

*Primary Examiner* — Thaddeus J Plecha

(57) ABSTRACT

A processing system includes a memory configured to store encrypted information representing state and control information for a guest virtual machine. The processing system further includes a processor configured to selectively reserve exclusive use of a set of performance monitoring counters by the guest virtual machine during execution of the guest virtual machine based on a state of a first control field accessed from the encrypted information for the guest virtual machine. The processor further is configured to permit or deny use of the set of performance monitoring counters by the guest virtual machine based on a state of a second control field set by a hypervisor and accessed from the decryption of the encrypted information for the guest virtual machine accessed from the memory.

17 Claims, 3 Drawing Sheets

(56) References Cited

OTHER PUBLICATIONS

Kocher, Paul et al.: "Spectre Attacks: Exploiting Speculative Execution". https://spectreattack.com/spectre.pdf.
AMD Secure Encrypted Virtualization (SEV); https://developer.amd.com/sev/.
VMware vSphere 7.0, Vmware by Broadcom. https://docs.vmware.com/en/VMware-vSphere/7.0/com.vmware.vsphere.vm_admin.doc/GUID-F1F913CB-05F9-4D4F-B8A7-970A43532003.html.
AMD. Indirect Branch Control Extension. 2018. URL: https://www.amd.com/content/dam/amd/en/documents/processor-tech-docs/white-papers/111006-architecture-guidelines-update-amd64-technology-indirect-branch-control-extension.pdf.

* cited by examiner

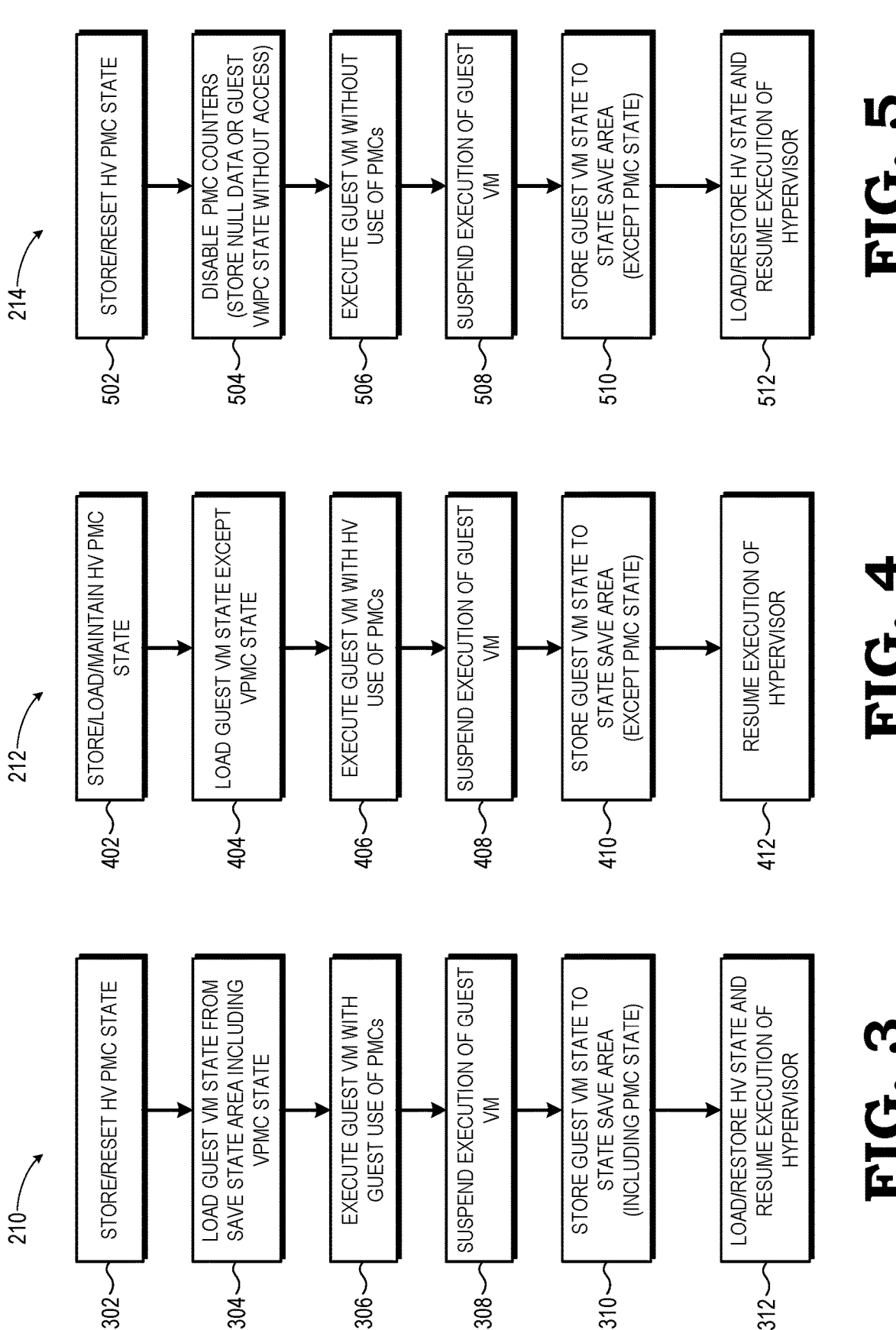

502 — STORE/RESET HV PMC STATE

504 — DISABLE PMC COUNTERS (STORE NULL DATA OR GUEST VMPC STATE WITHOUT ACCESS)

506 — EXECUTE GUEST VM WITHOUT USE OF PMCs

508 — SUSPEND EXECUTION OF GUEST VM

510 — STORE GUEST VM STATE TO STATE SAVE AREA (EXCEPT PMC STATE)

512 — LOAD/RESTORE HV STATE AND RESUME EXECUTION OF HYPERVISOR

402 — STORE/LOAD/MAINTAIN HV PMC STATE

404 — LOAD GUEST VM STATE EXCEPT VPMC STATE

406 — EXECUTE GUEST VM WITH HV USE OF PMCs

408 — SUSPEND EXECUTION OF GUEST VM

410 — STORE GUEST VM STATE TO STATE SAVE AREA (EXCEPT PMC STATE)

412 — RESUME EXECUTION OF HYPERVISOR

302 — STORE/RESET HV PMC STATE

304 — LOAD GUEST VM STATE FROM SAVE STATE AREA INCLUDING VPMC STATE

306 — EXECUTE GUEST VM WITH GUEST USE OF PMCs

308 — SUSPEND EXECUTION OF GUEST VM

310 — STORE GUEST VM STATE TO STATE SAVE AREA (INCLUDING PMC STATE)

312 — LOAD/RESTORE HV STATE AND RESUME EXECUTION OF HYPERVISOR

1

SECURE VIRTUALIZED PERFORMANCE MONITORING COUNTERS

BACKGROUND

Central processing units (CPUs), graphics processing units (GPUs), and other types of processors often implement performance monitoring counters (PMCs) to track various performance parameters. These PMCs are implemented as special hardware registers and corresponding performance monitoring logic of a processor may be configured to increment or decrement a PMC in response to a particular event, use a PMC to count the number of cycles between specified events, and the like. In a virtualized compute environment, the same set of hardware PMCs is shared between multiple guest virtual machines (VMs), and a hypervisor typically is tasked with managing the configuration of the PMCs for VM execution transitions, such that when the compute environment switches from executing a first guest VM to executing a second guest VM, the values of the PMCs for the first guest VM are saved for subsequent access by the first guest VM and the previously-saved values of the PMCs for the second guest VM are reloaded for access by the second guest VM. With this approach, the hypervisor has unsecured access to the PMCs of a guest VM. As the PMC values may provide insight into the workings of a guest VM, the conventional hypervisor-based management of the PMCs during guest VM switches provides an unfortunate opportunity for a side-channel attack on the guest VM through the hypervisor's access to the PMC values of a guest VM, particularly in confidential computing implementations in which the hypervisor is not trusted by default.

BRIEF DESCRIPTION OF THE DRAWINGS

The present disclosure is better understood and its numerous features and advantages made apparent to those skilled in the art by referencing the accompanying drawings. The use of the same reference symbols in different drawings indicates similar or identical items.

FIG. 3 is a flow diagram illustrating a sub-process of the method of FIG. 2 for execution of a guest VM with guest use of the virtualized PMCs in accordance with some embodiments.

FIG. 4 is a flow diagram illustrating a sub-process of the method of FIG. 2 for execution of a guest VM with hypervisor use of the virtualized PMCs in accordance with some embodiments.

FIG. 5 is a flow diagram illustrating a sub-process of the method of FIG. 2 for execution of a guest VM with disabled use of the virtualized PMCs in accordance with some embodiments.

DETAILED DESCRIPTION

Figure 1:
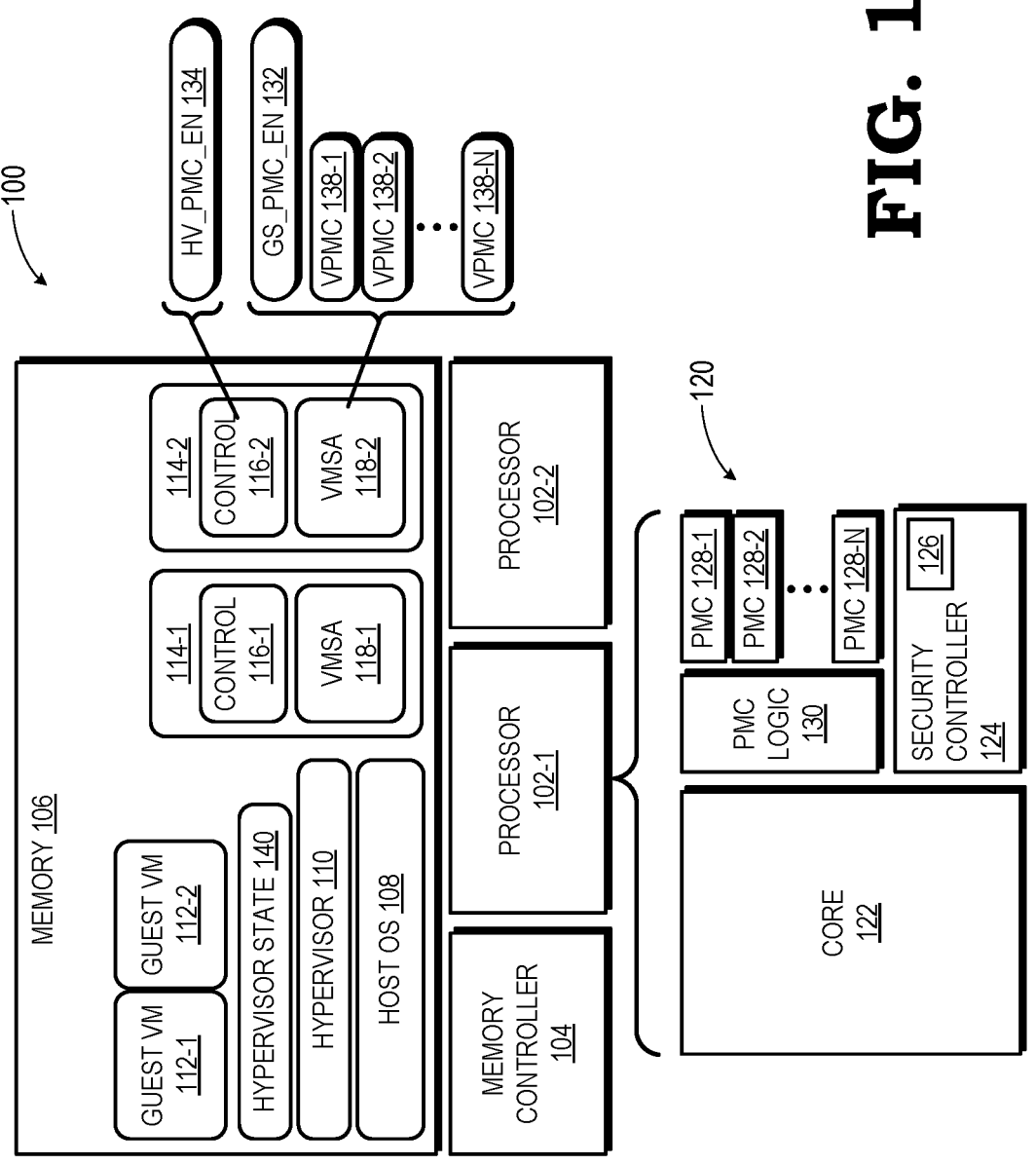
FIG. 1 is a block diagram of a processing system that utilizes secure virtualized PMCs with selective hypervisor access in accordance with some embodiments.

FIGS. 1-5 illustrate systems and techniques for providing secure virtualized performance monitoring counters (PMCs) with guest-controlled hypervisor access and hypervisor-controlled guest access. In a virtualized processing system that employs a hypervisor (or virtual machine manager (VMM)) to manage one or more guest virtual machines, one or more hardware PMCs of a processor are virtualized on a guest-by-guest basis through the use of a per-guest secure memory area to store state information for a corresponding guest virtual machine (VM) between world switches from one guest VM to another guest VM, with the stored state information including the state, or value, of one or more of the PMCs at the exit of the guest VM. This secure memory area is secured through various security techniques, including the use of hardware-based cryptography and guest-specific private cryptography keys to prevent clear access to the contents of the secure memory location by a secure hypervisor or other guest VM. While a guest VM is executing, performance monitoring logic of the processor can maintain PMCs for use by the guest VM or for use by the hypervisor, such as by adjusting various PMCs in response to events encountered during execution of the guest VM. The guest VM or hypervisor thus may use the PMCs to monitor the execution performance of the guest VM and/or reconfigure its operation accordingly.

As the use of PMCs often benefits a guest VM, in some instances processing performance may benefit from the hypervisor's access to the PMCs of a guest VM. However, a hypervisor's unmitigated use of the PMCs to track a guest VM also could provide an opportunity for a side-channel attack to gain unauthorized access to the operation of a guest VM through its PMCs. To illustrate, the hypervisor could track events during execution of the guest VM through the PMCs that allow the hypervisor to, for example, deduce a secret value used by the guest VM or to deduce what software application(s) the guest VM is running. Moreover, the use of the PMCs by a guest VM also may facilitate a side-channel attack on the hypervisor or another guest VM for similar reasons. Accordingly, in at least one embodiment, a virtualized compute environment provides some or all of its guest VMs the option to selectively reserve exclusive use of the PMCs for tracking events during execution of the corresponding guest VM; that is, a guest VM can elect to either opt-in or opt-out of use of PMCs as virtualized PMCs for the guest's exclusive use. Further, in some embodiments, the hypervisor likewise may selectively permit or deny a guest VM the use of the PMCs as virtualized PMCs for use by the guest VM (that is, to selectively designate the PMCs as for exclusive use by the hypervisor). Thus, this combination of guest-VM control and hypervisor control of the PMCs results in three available modes of operation with respect to the use of the PMCs during execution of the guest VM: a guest-use mode in which the PMCs are available for exclusive use by the guest VM for performance monitoring of the guest VM when elected by the guest VM and permitted by the hypervisor; a hypervisor-use mode in which the PMCs are available for exclusive use by the hypervisor for performance monitoring of the guest VM when the guest VM has elected to not exclusively use the PMCs; and a disabled-use mode in which the PMCs are disabled from use by either the guest VM or the hypervisor when the hypervisor has denied use of the PMCs to the guest VM and the guest VM has attempted to elect to use the PMCs for its exclusive use. In this manner, a guest VM may select between allowing or denying the hypervisor use of the PMCs during guest VM execution depending on various considerations, such as the benefits of providing hypervisor access, the particular risk of a side-channel attack through the hypervisor's access and the ramifications of a successful attack, and the like, and the hypervisor in turn may select between permitting or denying the guest VM exclusive use of the PMCs during guest VM execution depending on commensurate considerations.

FIG. 1 illustrates a secure processing system 100 in accordance with some embodiments. The secure processing system 100 may be implemented in, for example, a server, a workstation, a desktop computer, laptop computer, tablet computer, portable or wearable computing system (e.g., a cellular phone), a gaming console, and the like. The secure processing system 100 includes various hardware components, such as one or more processors 102 (e.g., processors 102-1 and 102-2), a memory controller 104, and one or more memories 106, as well as input/output (I/O) controllers, I/O devices, power supplies, mass storage devices, network interfaces, and the like (omitted from FIG. 1 for ease of illustration). The one or more processors 102 can include one or more general-purposes processors, such as a central processing unit (CPU) or a general-purpose graphics processing unit (GPGPU), one or more specialized processors (or "co-processors"), such as a graphics processing unit (GPU), a microcontroller, a tensor processing unit, a digital signal processor, and the like. The one or more memories 106 can include system memory (e.g., system random-access memory (RAM)), graphics memory, a cache hierarchy, specialized memory (e.g., Flash memory), read-only memory (ROM), and the like, or a combination thereof. Some or all of the hardware components may be implemented as discrete components (e.g., discrete processors mounted on a motherboard), in a system-on-a-chip (SoC), and the like.

The at least one memory 106 stores various sets of executable instructions (software) that are configured to manipulate the hardware components of the secure processing system 100 to perform various processes, including the processes described herein. In at least one embodiment, the secure processing system 100 is a virtualized system in which the hardware resources are virtualized so that multiple guests can share the same hardware resources in a time interleaved manner and in a way that isolates the guests from each other. As such, the software stored in the at least one memory 106 includes a host operating system (OS) 108 for overall management of the hardware components of the secure processing system and to act as the interface between the hardware components and other software layers and a hypervisor 110 (also referred to as a "virtual machine manager" or VMM) that operates to virtualize the hardware components for a plurality of guest virtual machines (VMs) 112, such as guest VMs 112-1 and 112-2. Each guest VM 112 includes a guest OS and one or more guest applications (not shown) that, when executing, interface with the underlying hardware components of the secure processing system 100 through the hypervisor 110 and the host OS 108, as is known in the art.

One frequent goal in compute virtualization is to isolate the guest VMs from each other so that one guest VM cannot inadvertently or intentionally access the data of another guest VM or otherwise control or observe the operation of another guest VM. Similarly, a secure compute environment also seeks to protect the guest VMs from data leakage or side-band attacks through, or by, the hypervisor that manages the guest VMs. Accordingly, in at least one embodiment, the secure processing system 100 employs encryption processes to encrypt the guest data, including guest state, stored in the one or more memories 106. Such encryption processes can include, for example, Secure Encrypted Virtualization-Encrypted State (SEV-ES), in which each guest VM is allocated a corresponding secure memory area 114 (e.g., implemented as a virtual memory control block (VCMB)) in the memory 106 and a hardware-controlled encryption key, such as a secure memory area 114-1 for guest VM 112-1 and secure memory area 114-2 for guest VM 112-2). Each secure memory area 114 can include a control store area 116 and a state save area 118. The control store area 116 is used to securely store various control bits and other control information, such as intercept vectors, feature enable/disable control bits, and other configuration information, and is accessible by the hypervisor 110. The state save area 118 (e.g., a virtual machine save area (VMSA)) is used to store the state information of the corresponding guest VM) between virtualized executions of the guest VM and is limited to access by the corresponding guest VM and secured against access by the hypervisor or other guest VMs.

A designated processor 102 (e.g., processor 102-1) operates to encrypt data being stored to the secure memory area 114 and to decrypt data being loaded from the secure memory area 114 using the encryption key of the corresponding encryption key. Thus, when a world switch occurs and a guest VM is loaded for execution (e.g., in response to a VMRUN), the previously-saved encrypted control information in the control store area 116 for the guest VM is accessed from the memory 106, decrypted, and used by the hypervisor 110 to configure the host OS 108, the hypervisor 110, and the hardware resources to prepare to resume execution of the guest VM. Similarly, hardware of the designated processor 102 operates to access the previously encrypted and stored guest state information from the state save area 118, decrypt the guest state information, and store the decrypted guest state information to the corresponding registers and other control fields of the processor 102. Thus, when execution of the guest VM resumes, the guest VM is effectively able to resume execution at the same point and with the same state the guest VM had when execution was previously suspended, thereby allowing the guest VM to effectively pick up where execution was previously suspended. A similar approach may be employed for securing hypervisor state 140 and other hypervisor data in the memory 106, using a similar save area (not shown) and the same or similar encryption processes so that the hypervisor state may be securely loaded for resumption of hypervisor execution and securely stored following suspension of the execution of the hypervisor.

An implementation of the processor 102-1 as this designated secure processor is illustrated in view 120 of FIG. 1. As shown, the processor 102-1 includes one or more processor cores 122 (e.g., CPU or GPU cores) for execution of instructions (such as the executable instructions of the host OS 108, the hypervisor 110, and the guest VMs 112) and a security controller 124 to provide various security functions for ensuring the integrity of the guest VMs 112 and their data. One such function includes the encryption (when storing) and decryption (when loading) of pages or other divisions of the memory 106 on a guest-by-guest basis using an encryption engine 126 (using, e.g., an Advanced Encryption Standard (AES) process) and using per-guest encryption keys (not shown), which includes the encryption and decryption of the contents of the control save area 116 and the state save area 118 of the secure memory area 114 of the corresponding guest VM 112. The security controller 124 may be implemented as one or more microcontrollers, microprocessors, and the like, and include local memory and local registers to store, for example, cryptographic keys, and includes interfaces to interact with the memory 106 and various configuration registers of the processor 102-1, including (as described below) PMC control logic of the processor 102-1.

Further, in at least one embodiment, the processor 102-1 provides performance monitoring counter (PMC) functionality in the form of one or more PMCs 128 (such as the illustrated PMCs 128-1, 128-2, and 128-N) and PMC control logic 130 operational to manage the PMCs 128 in accordance with their designated performance monitoring function. The PMC control logic 130 may include hardcoded logic, programmable logic, a microcontroller, or the like. The performance monitoring functions can include, for example, counting a number of events (e.g., instructions issued), counting cycles between events, counting cycles needed to perform a corresponding function (e.g., a number of cycles spent to execute a scalar memory read), a count of a number of items (e.g., number of valid threads running), and the like. For example, PMC 128-1 could be used to count the number of instructions issued, and thus the PMC control logic 130 increments the PMC 128-1 with each instruction issued at the processor 102-1, and further may trigger an interrupt once a specified threshold number of instructions issued has been met.

In implementations, some or all of the PMCs 128 of the processor 102-1 can be available for use by one or more of the guest VMs 112 for guest-specific performance monitoring. Accordingly, in at least one embodiment, the processor 102-1 is configured to virtualize the hardware PMCs 128 for use on a guest-by-guest basis. This virtualization includes storing the state of each applicable hardware PMC 128 as a corresponding virtual PMC (VPMC) state 138 in the state save area 118 of the secure memory area 114 of a guest VM when execution of the guest VM is suspended. Thus, upon a world switch in which execution of a guest VM is suspended, the state of each applicable PMC 128 used by the guest VM during its execution is encrypted by the security controller 124 and then stored in encrypted form as a VPMC state 138 in the state save area 118 for that guest PM. The PMC control logic 130 then either swaps the guest state values for the PMCs 128 with host state values (that is, PMC state values from hypervisor state 140), clears the PMCs 128, or a combination thereof. Thereafter, when another world switch occurs and the guest VM is prepared to resume execution, the security controller 124 accesses the encrypted VPMC states 138 from the state save area 118, decrypts the encrypted VPMC states 138 to generate unencrypted PMC states, and the PMC control logic 130 stores the unencrypted PMC states to their corresponding PMCs 128 so that execution of the guest VM can resume with the same PMC states as present when execution of the guest VM was previously suspended.

For example, if each of PMCs 128-1 to 128-N is used by guest VM 112-2 and designated as a "save" swap type, then the security controller 124 encrypts the current state of each of PMCs 128-1 to 128-N at the time of the world switch that suspends execution of the guest VM 112-2 and stores the encrypted result as VPMC states 138-1 to 138-N, respectively, in the state save area 118-2 of the secure memory area 114-2 associated with the guest VM 112-2, and the PMCs 128-1 to 128-N are then reset or loaded with hypervisor PMC state values, depending on the PMC type. Thereafter, when a subsequent world switch causes execution of the guest VM 112-2 to resume, the security controller 124 accesses the encrypted VPMC states 138-1 to 138-N from the state save area 118 and decrypts them to generate decrypted PMC states 1 to N, respectively, and the PMC control logic 130 stores these decrypted PMC states 1 to N into the hardware PMCs 128-1 to 128-N, respectively, before execution of the guest VM 112-2 resumes.

While the encryption of the state of a guest VM 112 while stored in the memory 106, including the encryption of PMC state of the guest VM 112, substantially secures access to the PMC state of the guest VM 112 by another guest VM, a hypervisor conventionally has unfettered use of the PMCs of a processor, and thus the hypervisor may serve, intentionally or accidentally, as the conduit for a side-channel attack whereby the hypervisor uses the PMCs to monitor guest events and, through this monitoring, infer information regarding the guest VM. Accordingly, to mitigate such vulnerabilities, in at least one embodiment, the processor 102-1 is configured to provide one or more of the guest VMs 112 the option to reserve exclusive use of the PMCs 128 during execution of the guest VM 112.

In at least one embodiment, this selective PMC reservation feature is implemented as a control field 132, such as a control bit designated herein as "GS_PMC_EN", which is stored in the state save area 118 for a corresponding guest VM 112. To reserve exclusive access to the PMCs 128 while the guest VM 112 is executing, the guest VM 112 may configure the control field 132 to have one state (e.g., "1"). Conversely, to refrain from reserving exclusive access to the PMCs 128, the guest VM 112 may configure the control field 132 to have a different state (e.g., "0"). Thus, when the encrypted contents of the state save area 118 are accessed and decrypted by the security controller 124, and the resulting decrypted state information is used to configure the processor 102-1 for execution of the guest VM 112, the decrypted state of the control field 132 is used to configure the PMC control logic 130 so as either to load the guest PMC state values into the PMCs 128 and permit only the guest VM 112 to use the PMCs 128 for performance monitoring while the guest VM 112 is executing (subject to hypervisor permission, described below) or to load the hypervisor state values into the PMCs 128 (or maintain the current hypervisor PMC values already present) and permit only the hypervisor 110 to use the PMCs 128 for performance monitoring while the guest VM 112 is executing.

As such, the use of the control field 132 allows a guest VM 112 to selectively reserve exclusive use of the PMCs 128 (and thus selectively deny access to the PMCs 128 by the hypervisor 110) depending on the needs of the guest VM 112 and the risks of hypervisor use of the PMCs 128 during execution of the guest VM 112. For example, in some implementations the hypervisor 110 may be able to substantially aid the guest VM 112 in improved performance through the access to the PMCs 128 by the hypervisor 110 and reconfiguration of aspects of the system 100 accordingly, while at the same time the risk of malicious use of guest data or guest state may be low. In such instances, the guest VM 112 may refrain from reserving exclusive access to the PMCs and thus permit the hypervisor 110 to use the PMCs 128 during guest VM execution as the benefits outweigh the risks. In other implementations in which the guest VM 112 has need to utilize the PMCs 128 for its own performance monitoring, the hypervisor 110 may be of limited benefit in its own performance monitoring of the guest VM 112, or there may be significant ramifications if the guest data or guest state of the guest VM 112 is leaked, the guest 112 may instead elect to reserve exclusive use of the PMCs 128 and thus mitigate this risk.

Moreover, not only does the use of the control field 132 allow a guest VM 112 to reserve exclusive use to the PMCs 128 when in use by the guest VM 112, the fact that the control field 132 is stored in the encrypted state save area 118 that is protected from access by any entity besides the guest VM 112 and the hardware of the processor 102-1 itself through one or more security functions means that a malicious hypervisor 110 cannot simply disregard the intent of the guest VM 112 with respect to reserved usage of the PMCs 128 when in use by the guest VM 112. As such, the hypervisor 110 cannot simply bypass the setting of the control field 132 to gain access to the PMCs 128.

However, while the hypervisor's use of the PMCs 128 during execution of a guest VM 112 can present a leakage risk, the use of the PMCs 128 by the guest VM likewise can present a leakage risk to the hypervisor 110 or another guest VM 112. Accordingly, in implementations, the processor 102-1 also provides the hypervisor 110 with the option to selectively permit or deny use of the PMCs 128 to a guest VM 112 on a guest-by-guest basis. In at least one embodiment, this selective per-guest PMC use feature is implemented as a control field 134, such as a control bit designated herein as "HV_PMC_EN", which is stored in the control save area 116 of a secure memory area 114 for a corresponding guest VM 112. To permit guest use of the PMCs 128 while a guest VM 112 is executing, the hypervisor 110 may configure the control field 134 to have one state value (e.g., "1"), and to configure the control field 134 to have a state indicating denial of use of the PMCS 128 by the guest VM 112 access to the PMCs 128, the hypervisor 110 may configure to the control field 134 to have a different state value (e.g., "0"). Thus, when the encrypted contents of the control save area 116 are accessed and decrypted by the security controller 124, and the resulting decrypted control information is used to configure the hypervisor 110, the host OS 108, and the processor 102-1 for execution of the guest VM 112, the decrypted state of the control field 134 is used to configure the PMC control logic 130 so as to prevent or allow use of the PMCs 128 by the guest VM 112 depending on the state of the control field 134. For example, if guest VM use of the PMCs 128 is denied by the hypervisor 110 (HV_PMC_EN=0), then an attempt by the guest VM 112 to load any valid data (e.g., any non-zero values) into a PMC 128 would be intercepted by the PMC control logic 130 and trigger an appropriate action, such as return of an error, triggering a failure of the world swap so that execution of the guest VM 112 is not initiated, and the like.

Thus, the two control fields 132 and 134, three modes may be implemented with regard to selectively reserving use of the hardware PMCs 128: a guest use mode (HV_PMC_EN=1, GS_PMC_EN=1) in which the hypervisor 110 permits the guest VM 112 to use the PMCs 128 and the guest VM 112 has elected to reserve exclusive use of the PMCs 128; a hypervisor-use mode (HV_PMC_EN=X, GS_PMC_EN=0) in which the guest VM 112 has not attempted to exclusively reserve the use of the PMCs 128 and thus the PMCs 128 are available for exclusive use by the hypervisor 110; and a disabled-use mode (HV_PMC_EN=0, GS_PMC_EN=1) in which the hypervisor 110 denies the guest VM 112 use of the PMCs 128 and the guest VM 112 denies the hypervisor 110 use of the PMCs 128 (through requesting to reserve exclusive use of the PMCs 128), and thus effectively disabling the PMCs 128 as neither the hypervisor 110 nor the guest VM 112 can use them. Thus, a guest VM 112 and the hypervisor 110 can utilize these two control options to implement a PMC access policy that is better suited to the particular needs and risks of both the hypervisor 110 and the guest VM 112.

Figure 2:
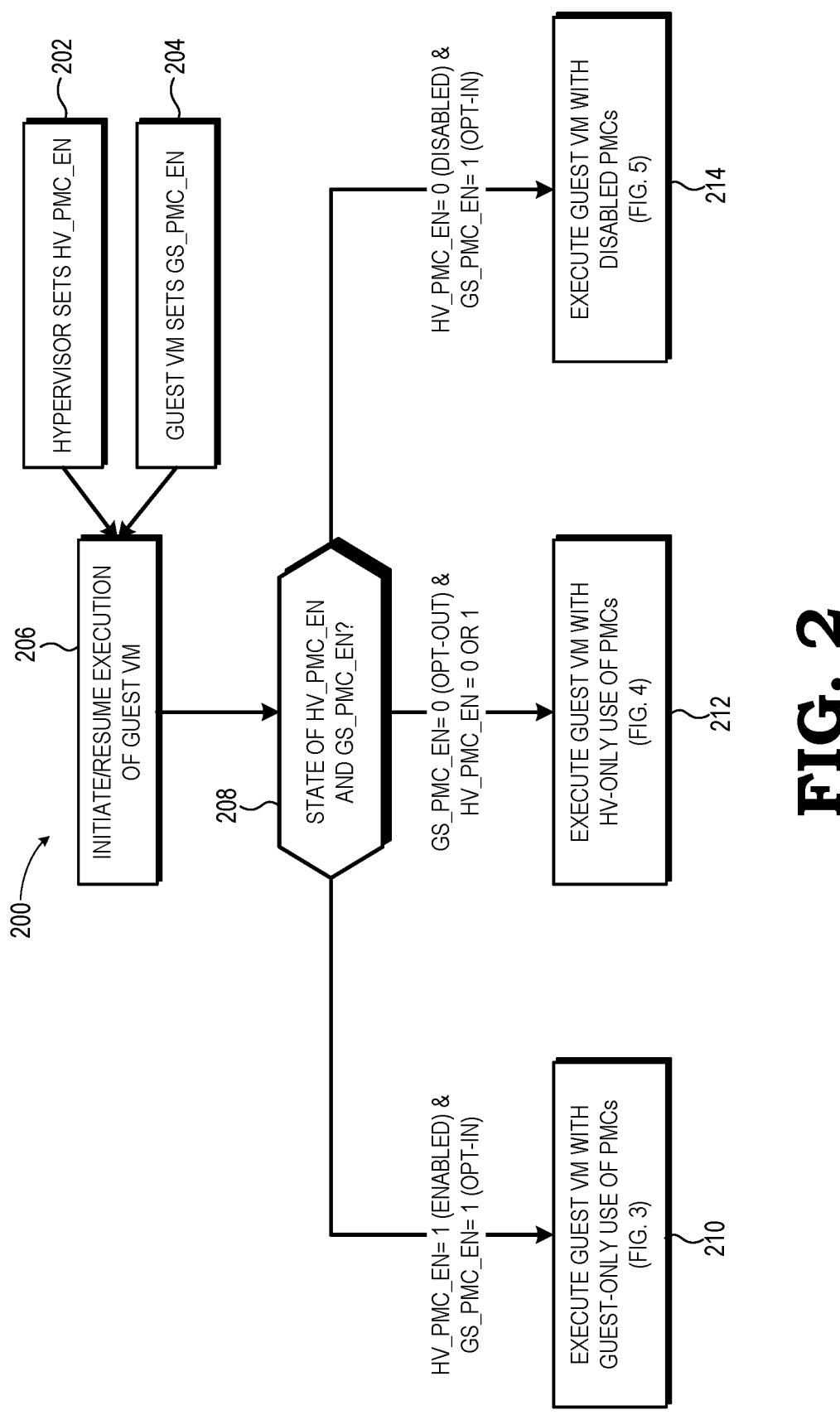
FIG. 2 is a flow diagram illustrating an example method for providing virtualized PMCs with guest-controlled hypervisor access in accordance with some embodiments.

FIG. 2 illustrates a method 200 of operation of the secure processing system 100 of FIG. 1 for selective use of the PMCs 128 of the processor 102-1 in accordance with some embodiments. As explained above, the processor 102-1 implements two control fields 132 and 134 to control access to and use of the PMCs 128 by the hypervisor 110 and a guest VM 112, respectively. Accordingly, the method 200 initiates at blocks 202 and 204 with the initial configuration of the PMC access policy to be employed via these two control fields 132, 134. In particular, at block 202 the hypervisor 110 sets the preferred access mode for a guest VM 112 by storing (via the security controller 124) the corresponding configuration value for control field 134 in the control save area 116 of the secure memory area 114 associated with the guest VM 112. Using the example, above, this control field 134 can be set to "0" to prevent the guest VM 112 from using the PMCs 128 or set to "1" to allow the guest VM 112 to use the PMCs 128. Similarly, at block 204 the guest VM 112 sets its intention for the use of the PMCs 128 by storing the corresponding configuration value for the control field 132 (e.g., by storing a "0" to indicate the guest VM 112 does not intend to exclusively use the PMCs 128 or storing a "1" attempt to reserve the PMCs 128 for exclusive use by the guest VM 112). This may be performed during the initialization of the guest VM 112 for its first execution, or during subsequent resumption of execution of the guest VM 112 (that is, the guest VM 112 may dynamically change the hypervisor-access policy in response to, for example, an increase or decrease in the risk or ramifications of a side-channel attack through the PMCs 128 as execution of the guest VM 112 progresses).

At block 206, execution of the guest VM 112 is initiated or resumed in response to a world switch (e.g., execution of a VMRUN instruction). As explained above, a world switch or other resumption of execution of the guest VM 112 triggers the access of the control information and state information previously saved for the guest VM 112 from the corresponding secure memory area 114 reserved for the guest VM 112. This includes the access and decryption of the encrypted control information in the control save area 116 by the security controller 124 using the guest-specific cryptographic key and the configuration of the hardware of the processor 102-1, the hypervisor 110, and/or the host OS 108 according to the decrypted control information accordingly. This also includes the access and decryption of the encrypted state information in the state save area 118 by the security controller 124 and the storage of the decrypted state information to the corresponding registers and other control fields of the processor 102-1.

In at least one embodiment, the decrypted control information accessed from the control save area 116 includes the control field 134 (HV_PMC_EN), which was configured by the hypervisor 110 at block 202 to indicate whether the corresponding guest VM 112 is permitted to use the PMCs 128 during execution, as well as the control field 132 (GS_PMC_EN) that allows the guest VM 112 to selectively reserve exclusive use of the PMCs 128 during guest VM execution (subject to hypervisor permission via the control field 134). Accordingly, at block 208 the PMC control logic 130 determines usage mode to be employed for the PMCs 128 during the resumed execution of the guest VM 112 from these control fields 132, 134. As explained above, when the hypervisor 110 enables the guest VM 112 to use the PMCs 128 and the guest VM 112 opts-in to reserving exclusive usage of the PMCs 128 (that is, HV_PMC_EN=1 & GS_PMC_EN=1), then at block 210 the PMC control logic 130 employs a guest-use mode for the PMCs 128 during execution of the guest VM 112, as described in more detail below with reference to FIG. 3. When the guest VM 112 opts out of reserving exclusive use of the PMCs 128 (that is, GS_PMC_EN=0 & HV_PMC_EN=X [X=0 or 1]), then at block 212 the PMC control logic 130 employs a hypervisor-use mode for the PMCs 128 during execution of the guest VM 112, as described in detail below with reference to FIG. 4. However, when the hypervisor 110 prevents the guest VM 112 from using the PMCs 128 and the guest VM 112 prevents the hypervisor 110 from using the PMCs 128 (by attempting to opt-into exclusive use of the PMCs 128)(that is, HV_PMC_EN=0 & GS_PMC_EN=1), then at block 214 the PMC control logic 130 employs a disabled mode for the PMCs 128 during execution of the guest VM 112, as described in detail below with reference to FIG. 5.

Referring to FIG. 3, execution of the guest VM 112 using guest-use mode for the PMCs 128 as represented by block 210 of method 200 is described in accordance with implementations. With the world switch initiated, the PMCs 128 initially store hypervisor PMC state values. If the hypervisor 110 is configured to maintain the PMC state for the hypervisor 110, at block 302 the hypervisor 110 can arrange for the storing to the hypervisor state 140 of those PMC state values for the PMCs 128 having a type intended to be saved between executions of the hypervisor 110 (referred to herein as "persistent" PMCs), while those state values for PMCs 128 intended to be cleared between world switches (referred to herein as "transitory" PMCs) are cleared from the corresponding PMCs 128 (e.g., such PMCs 128 are "reset" to a default value). In other embodiments, the PMC control logic 130 simply resets the PMCs 128 if the hypervisor 110 is done with them. At block 304 the processor 102-1 loads the guest VM state from the state save area 118 for the guest VM 112, which includes the PMC control logic 130 loading the saved VPMC states 138-1 to 138-N to the PMCs 128-1 to N, respectively.

With the processor 102-1 so configured with the previously-saved state of the guest VM 112, at block 306 the processor 102-1 resumes execution of the guest VM 112, during which the guest VM 112 may monitor its own performance via updates to the values of the PMCs 128 in response to corresponding execution events. Subsequently, at block 308 another world switch is initiated and execution of the guest VM 112 is suspended. As part of the world switch process, at block 310 guest VM state at the time of suspension is stored in encrypted form back to the state save area 118 for the guest VM 112, including the PMC control logic 130 storing the values of the persistent PMCs 128 as VPMC states 138 and resetting or otherwise clearing the values of the transitory PMCs 128. At block 312, the previously-saved hypervisor state 140 for the hypervisor 110 is restored to the processor 102-1, including loading the saved hypervisor PMC state values for the persistent PMCs 128, and execution of the hypervisor 110 resumes at the processor 102-1. In other embodiments, rather than loading saved hypervisor PMC state values, the PMCs 128 are instead reinitialized to known starting, or default, values.

Referring to FIG. 4, execution of the guest VM 112 using hypervisor-use mode for the PMCs 128 as represented by block 212 of method 200 is described in accordance with implementations. With initiation of the world switch from hypervisor 110 to guest VM 112, at block 402 the hypervisor 110 can arrange for storing of its state values in the persistent PMCs 128 to the hypervisor state 140 if so desired. At block 404 the processor 102-1 loads the guest VM state from the state save area 118 for the guest VM 112. However, as the PMC control logic 130 and the rest of the processor 102-1 are in the hypervisor-use mode with respect to the PMCs 128 for this sub-process, some or all of the PMCs 128 may already be storing the correct hypervisor PMC state (that is, the world switch doesn't impact the current states of the PMCs 128 as they are already in use by the hypervisor 110), in which case the PMC control logic 130 merely maintains the current states of the PMCs 128 at block 404.

With the processor 102-1 generally configured with the previously-saved state of the guest VM 112 and specifically configured with hypervisor PMC state, at block 406 the processor 102-1 resumes execution of the guest VM 112, during which the hypervisor 110 may monitor performance of the guest VM 112 and/or other processes via updates to the values of the PMCs 128 in response to corresponding execution events. Subsequently, at block 408 another world switch is initiated and execution of the guest VM 112 is suspended. As part of the world switch process, at block 410 guest VM state at the time of suspension is stored in encrypted form back to the state save area 118 for the guest VM 112. However, unlike the guest-use mode described above, the guest VM 112 has not had access to, or use of, the PMCs 128, and thus the PMC control logic 130 refrains from storing the states of any of the PMCs 128 as VPMC states 138 for the guest VM 112. Thus, at block 412, the processor 102-1 resets or otherwise clears the values of the transitory PMCs 128 and execution of the hypervisor 110 resumes at the processor 102-1.

Referring to FIG. 5, execution of the guest VM 112 using disabled-use mode for the PMCs 128 as represented by block 214 of method 200 is described in accordance with implementations. With initiation of the world switch from hypervisor 110 to guest VM 112, at block 502 the hypervisor 110 can store its state values in the persistent PMCs 128 to the hypervisor state 140 if so desired, and the transient PMCs 128 are reset. At block 504 the processor 102-1 loads the guest VM state from the state save area 118 for the guest VM 112. However, as the PMC control logic 130 and the rest of the processor 102-1 are in the disabled-use mode with respect to the PMCs 128 for this sub-process, the PMC control logic 130 operates to prevent use of, or access to, the PMCs 128 by either the hypervisor 110 or the guest VM 112. This can include clearing or resetting the PMCs 128 to a default value, or storing invalid data to the PMCs 128. Alternatively, the guest PMC states (VPMC values 138) can be loaded to the corresponding PMCs 128, but the PMC control logic 130 also designates these PMCs 128 as "disabled", such that an attempt by the guest VM 112 to modify a disabled PMC 128 triggers an action by the processor 102-1 that ensures the guest VM 112 does not modify or otherwise access the PMC 128, such as by returning an error or by failing the attempt to world switch to the guest VM 112 and thus return to hypervisor execution for further handling.

With the processor 102-1 generally configured with the previously-saved state of the guest VM 112 and with the PMCs 128 effectively disabled, at block 506 the processor 102-1 resumes execution of the guest VM 112, but with the hypervisor 110 and the guest VM 112 prevented from performance monitoring via the PMCs 128. Subsequently, at block 508 another world switch is initiated and execution of the guest VM 112 is suspended. As part of the world switch process, at block 410 guest VM state at the time of suspension is stored in encrypted form back to the state save area 118 for the guest VM 112. However, as the PMCs 128 were disabled during execution of the guest VM 112, the PMCs 128 do not contain valid guest PMC state nor valid hypervisor PMC state, and thus the PMC control logic 130 refrains from storing the states of any of the PMCs 128. Rather, at block 512, the processor 102-1 loads the save hypervisor PMC state values from the hypervisor state 140 into the persistent PMCs 128 and resets or otherwise clears the values of the transitory PMCs 128 and execution of the hypervisor 110 resumes at the processor 102-1. In other embodiments, rather than loading saved hypervisor PMC state values, the PMCs 128 are instead reinitialized to known starting, or default, values.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system comprising:
a memory configured to store encrypted information representing state and control information for a guest virtual machine; and
a processor configured to:
decrypt the encrypted information to access a first control field associated with the guest virtual machine; and
selectively reserve exclusive use of a set of performance monitoring counters by:

reserving exclusive use of the set of performance monitoring counters by the guest virtual machine during execution of the guest virtual machine responsive to the first control field having a first state; and permitting exclusive use of the set of performance monitoring counters by a hypervisor during the execution of the guest virtual machine responsive to the first control field having a second state different than the first state.

2. The processing system of claim 1, wherein the guest virtual machine configures the state of the first control field prior to the execution of the guest virtual machine.

3. The processing system of claim 1, wherein the processor further is configured to:
encrypt information that includes the first control field to generate the encrypted information; and
store the encrypted information at the memory prior to the execution of the guest virtual machine.

4. A processing system comprising:
a memory configured to store encrypted information representing state and control information for a guest virtual machine; and
a processor configured to:
decrypt the encrypted information to access a first control field and a second control field associated with the guest virtual machine;
selectively reserve exclusive use of a set of performance monitoring counters for the guest virtual machine based on the encrypted information; and
selectively permit use of the set of performance monitoring counters by the guest virtual machine based on a state of the second control field that is set by a hypervisor and is accessed from a decryption of the encrypted information for the guest virtual machine accessed from the memory.

5. The processing system of claim 4, wherein the processor further is configured to:
encrypt information that includes the first control field and the second control field to generate the encrypted information; and
store the encrypted information at the memory prior to an execution of the guest virtual machine.

6. The processing system of claim 4, wherein the processor is configured to disable use of the set of performance monitoring counters by either of the guest virtual machine and the hypervisor during execution of the guest virtual machine responsive to the state of the first control field indicating the guest virtual machine is requesting to reserve exclusive use of the set of performance monitoring counters and the state of the second control field indicating denial of use of the set of performance monitoring counters by the guest virtual machine.

7. A method comprising:
accessing, from a memory, first encrypted information associated with a guest virtual machine at a processor; and
based on a state of a first control field of the first encrypted information, selectively reserving exclusive use of a set of performance monitoring counters by:
reserving exclusive use of the set of performance monitoring counters by the guest virtual machine during a first execution of the guest virtual machine responsive to the first control field having a first state; and
permitting exclusive use of the set of performance monitoring counters by a hypervisor during the first execution of the guest virtual machine responsive to the first control field having a second state different than the first state.

8. The method of claim 7, further comprising:
during a second execution of the guest virtual machine prior to the first execution, configuring the state of the first control field;
encrypting, at the processor, first state information associated with the guest virtual machine, including the state of the first control field, to generate the first encrypted information; and
storing the first encrypted information to the memory.

9. The method of claim 8, wherein:
the first state information includes a state of each of one or more performance monitoring counters of the set of performance monitoring counters at a suspension of the second execution; and
the method further includes:
decrypting the first encrypted information includes decrypting the first encrypted information to obtain the state of each of the one or more performance monitoring counters from the first state information at the processor; and
updating the one or more performance monitoring counters with a corresponding state obtained from the first encrypted information.

10. The method of claim 8, further comprising:
accessing, from the memory, second encrypted information associated with the guest virtual machine; and
wherein selectively reserving exclusive use of the set of performance monitoring counters by the guest virtual machine is further based on a state of a second control field accessed from the second encrypted information.

11. The method of claim 10, further comprising:
setting, by a hypervisor, a state of the second control field prior to the first execution.

12. The method of claim 11, wherein selectively reserving exclusive use of the set of performance monitoring counters by the guest virtual machine comprises:
reserving exclusive use of the set of performance monitoring counters by the guest virtual machine during the first execution responsive to the first control field having a first state and the second control field having a second state;
reserving exclusive use of the set of performance monitoring counters by the hypervisor during the first execution responsive to the first control field having a third state different than the first state; and
disabling use of the set of performance monitoring counters by either of the guest virtual machine and the hypervisor responsive to the first control field having the first state and the second control field having a fourth state different than the second state.

13. A non-transitory computer-readable medium embodying a set of executable instructions, the set of executable instructions to manipulate at least one processor to:
access, from a memory, encrypted information associated with a guest virtual machine;
decrypt the encrypted information to access a first control field associated with the guest virtual machine; and
selectively reserve exclusive use of a set of performance monitoring counters by:
reserving exclusive use of the set of performance monitoring counters by the guest virtual machine during execution of the guest virtual machine responsive to the first control field having a first state; and
permitting exclusive use of the set of performance monitoring counters by a hypervisor during the execution of the guest virtual machine responsive to the first control field having a second state different than the first state.

14. The non-transitory computer-readable medium of claim 13, wherein the guest virtual machine is configured to configure a state of the first control field prior to the execution of the guest virtual machine.

15. The non-transitory computer-readable medium of claim 14, wherein the set of executable instructions further manipulate the at least one processor to:
encrypt information that includes the first control field to generate the encrypted information; and
store the encrypted information at the memory prior to the execution of the guest virtual machine.

16. The non-transitory computer-readable medium of claim 13, wherein the set of executable instructions manipulate the at least one processor to selectively permit use of the set of performance monitoring counters by the guest virtual machine based on a state of a second control field that is set by a hypervisor and is accessed from the decryption of the encrypted information for the guest virtual machine accessed from the memory.

17. The non-transitory computer-readable medium of claim 16, wherein the set of executable instructions further manipulate the at least one processor to:
encrypt information that includes the first control field and the second control field to generate the encrypted information; and
store the encrypted information at the memory prior to an execution of the guest virtual machine.

* * * * *